Feb. 17, 1942.          R. H. GUYTON                  2,273,189
                        BOTTLE COOLER
                     Filed May 7, 1936              7 Sheets-Sheet 1
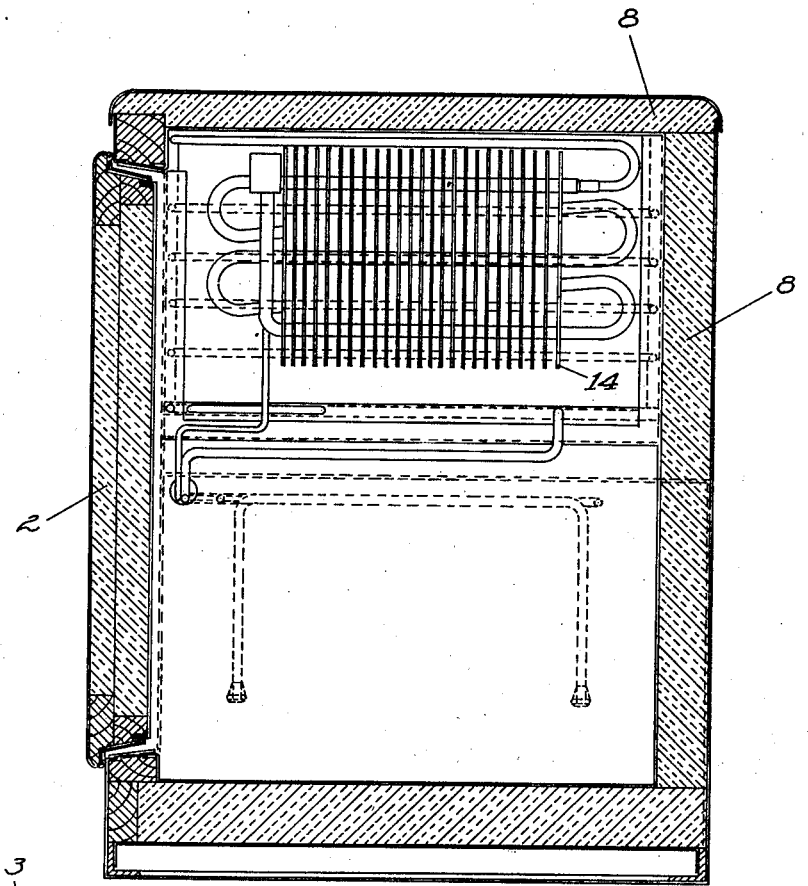
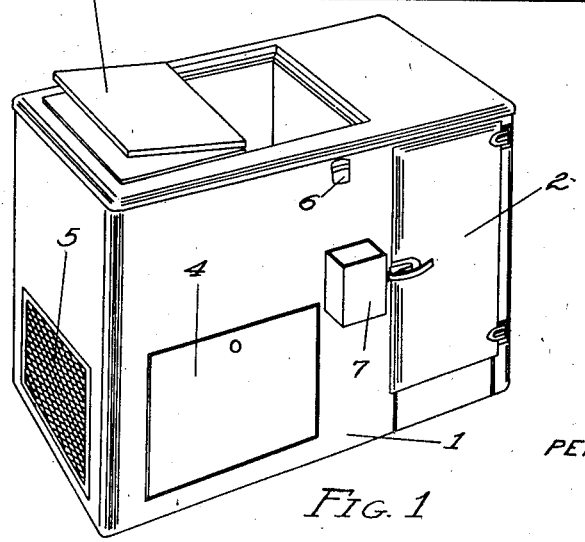
ROBERT H. GUYTON
   INVENTOR
PER  *Albert J. Fike*
           ATTORNEY

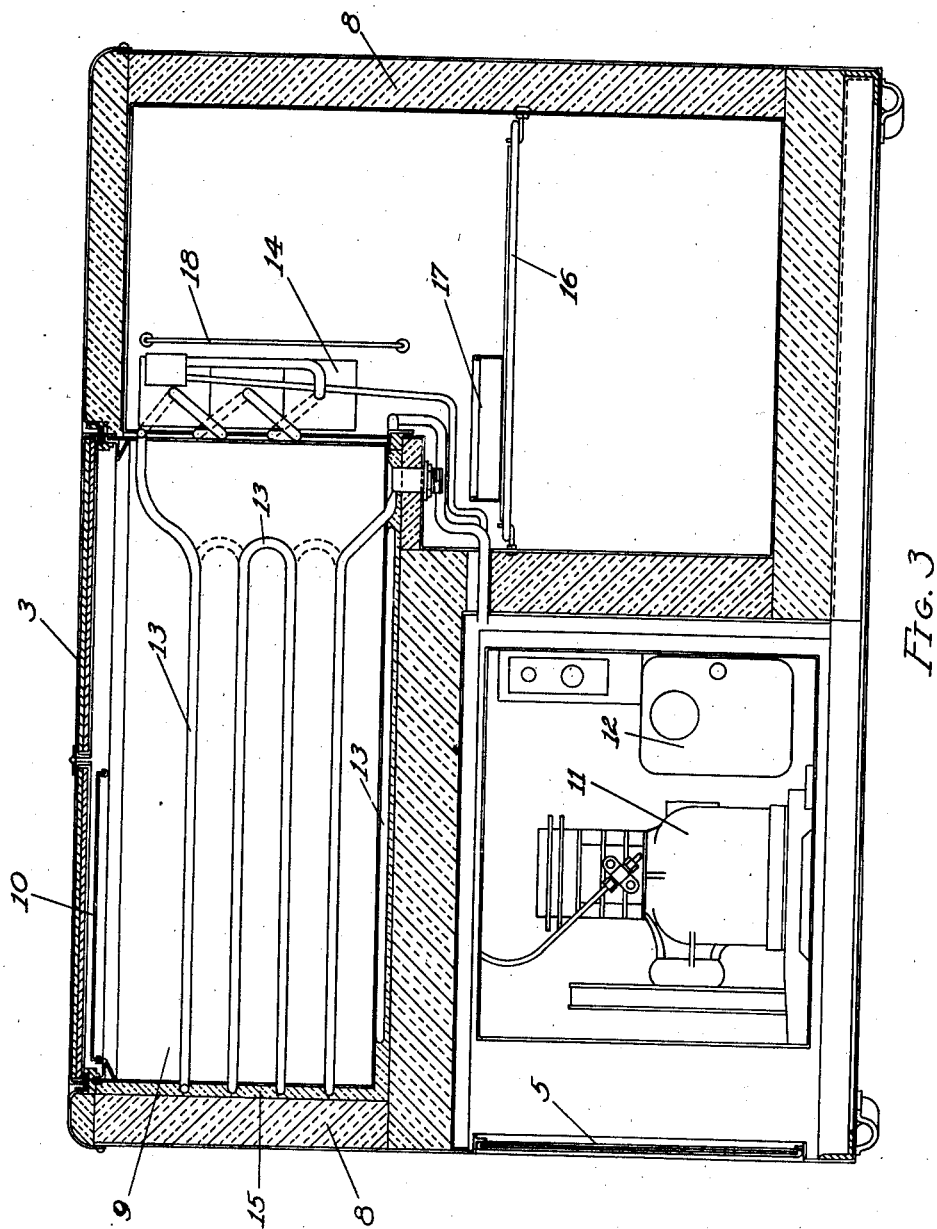

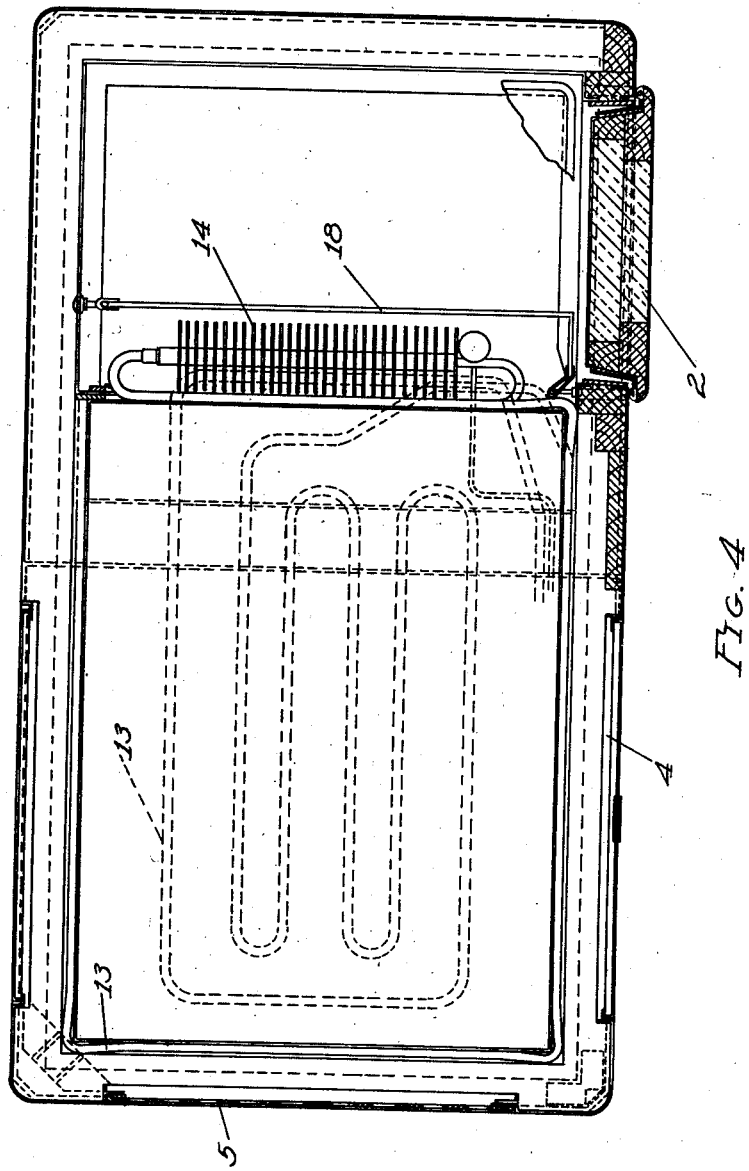

Feb. 17, 1942.                 R. H. GUYTON                   2,273,189
                               BOTTLE COOLER
                            Filed May 7, 1936                 7 Sheets-Sheet 4
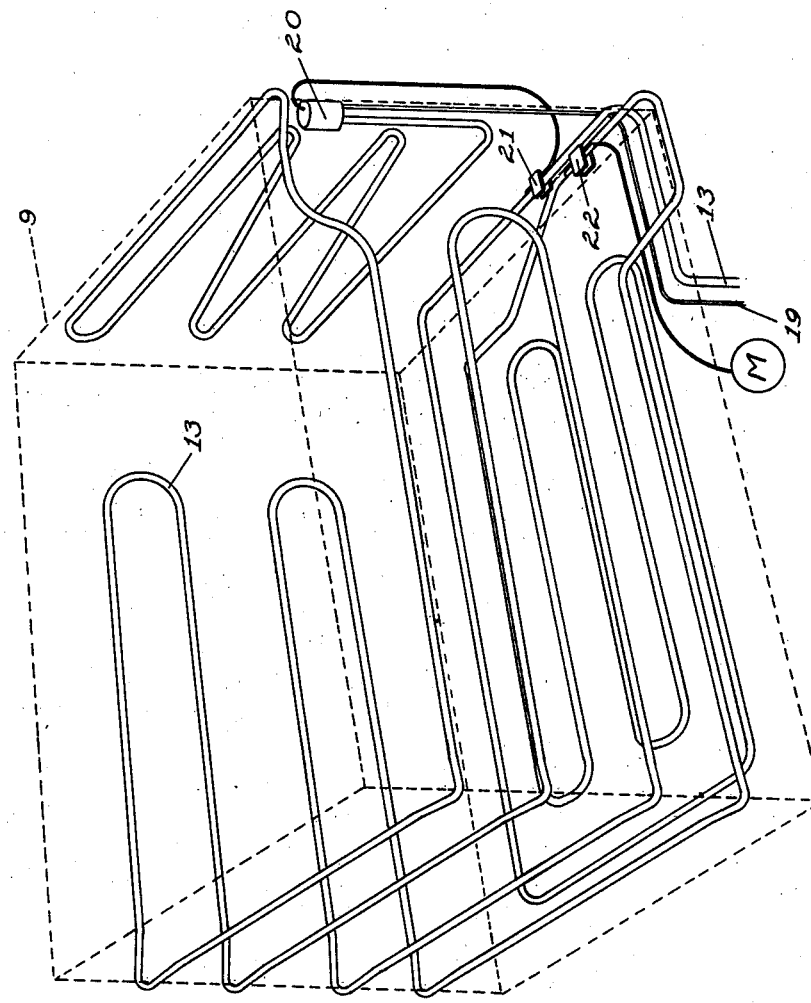
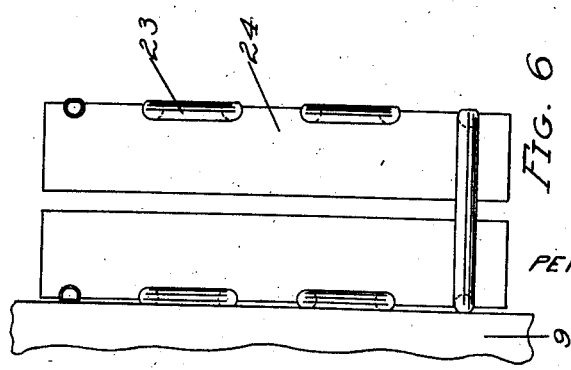
ROBERT H. GUYTON
INVENTOR
PER Albert J. Frihe
ATTORNEY Feb. 17, 1942.    R. H. GUYTON    2,273,189
BOTTLE COOLER
Filed May 7, 1936    7 Sheets-Sheet 5
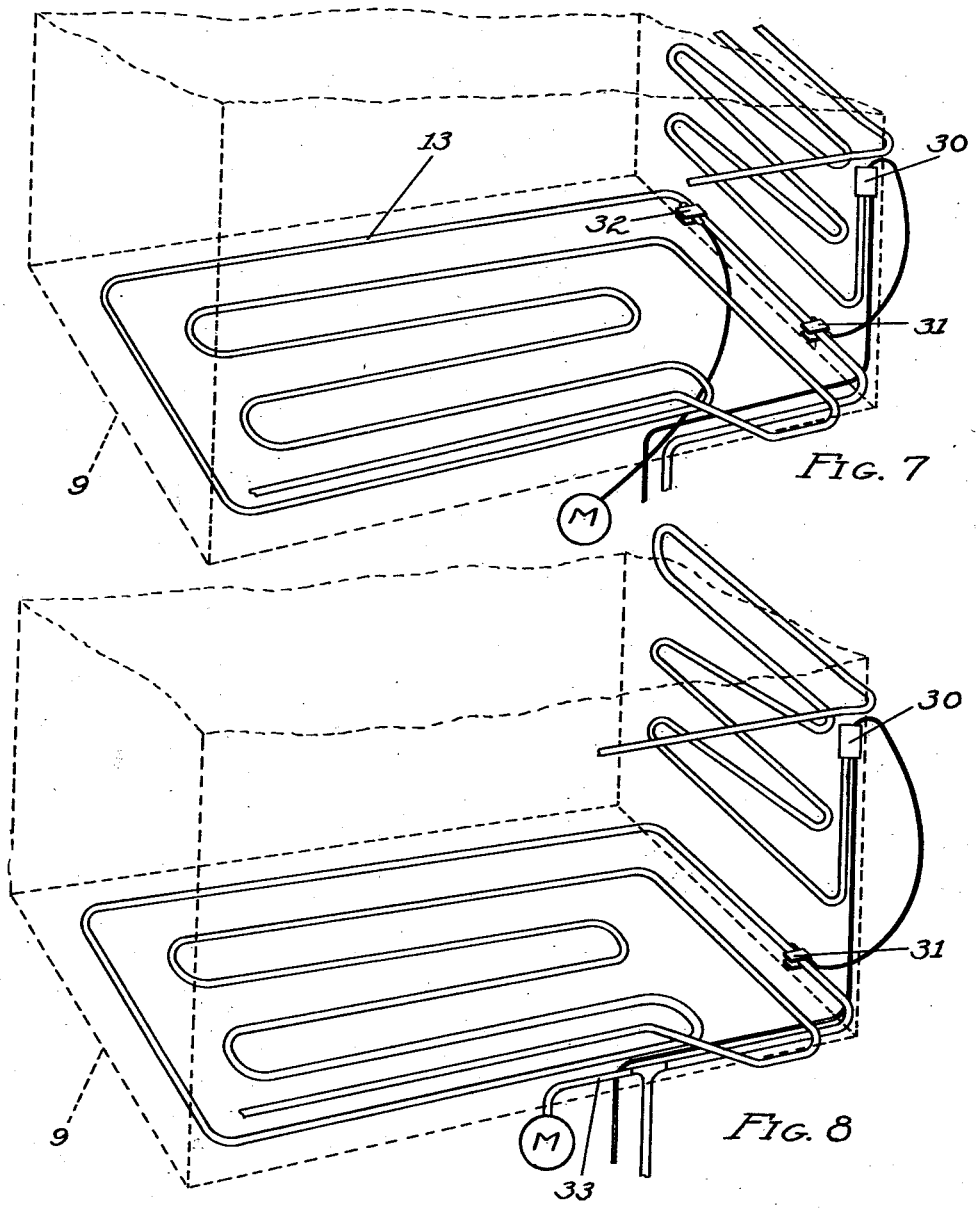
ROBERT H. GUYTON
INVENTOR
PER   Albert J. Frike
ATTORNEY.

Patented Feb. 17, 1942

2,273,189

UNITED STATES PATENT OFFICE 2,273,189

BOTTLE COOLER

Robert H. Guyton, Oak Park, Ill., assignor to The Brunswick-Balke-Collender Company, Chicago, Ill., a corporation of Delaware Application May 7, 1936, Serial No. 78,332

8 Claims. (Cl. 62—128)

This invention relates to a new and improved bottle cooler particularly designed and constructed for refrigerating bottled beverages, and has for one of its principal objects the provision of a compartment for pre-cooling bottled beverages in a dry state and an immersion tank for finally cooling said beverages and other similar articles.

One of the important objects of this invention is to provide in a bottle cooler or the like a refrigerating mechanism which will maintain the wet compartment or immersion tank at a temperature which is above the freezing point of water, or approximately around 33 degrees, whereby the bottled beverages delivered therefrom will always be at a temperature below 40 degrees and thereby be satisfactorily palatable.

Another object of the invention is to provide in a bottle cooling apparatus controlled by mechanical refrigeration, elements for cooling a liquid bath in which the bottled beverages are stored and wherein ice may be at times formed in the liquid bath, at least, on the walls thereof, without in any way interfering with the proper operation of the device, and which ice, if so formed, will in effect tend to promote the better efficiency of the apparatus as a whole.

A still further object of the invention is the provision of automatic means in connection with the cooling elements for the immersion tank whereby any ice formed on the sides thereof will automatically be released or broken away from the sides thereof and will thereupon float on the surface of the immersion tank for practically indefinite periods, thereby adding to the sales appeal of the merchandise stored in such immersion tank.

A further object of the invention is to so position the immersion tank in relationship to the dry storage compartment that the cooling effect of the gasified refrigerant will be first directly applied to the immersion tank, particularly to the sides and bottom thereof, and after a desired cooling of this portion of the device has been effected a further cooling action will continue to take place in the dry storage compartment. Some of this is provided by the installation of additional cooling coils in the dry compartment but adjacent the wet compartment.

An additional feature of the invention relates to the arrangement of the refrigerating coils with relationship to the wet storage compartment, particularly the winding of the same around the sides and bottom thereof, the insulating structure accompanying these windings or coils, and the particular control elements whereby the refrigerating effect is properly and adequately maintained at all times.

Obviously the entire apparatus is constructed so as to be entirely automatic in its operation, both as to the control of the temperature in the various compartments, the forming and automatic breaking off of ice in the wet compartment, the conduction of cold air from one compartment to the other by convection, and the predetermined regulation of different temperatures in both compartments, the dry compartment being maintained at approximately ten degrees higher temperature than the temperature of the liquid in the immersion tank.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective view of the improved bottle cooler of this invention, showing the exterior cabinet construction.

Figure 2 is a vertical sectional view through the dry storage compartment, showing the refrigerating coils and the respective connections.

Figure 3 is a vertical longitudinal sectional view of the apparatus, showing both the wet and dry compartments, the cooling coils and controls, and the compressor mechanism.

Figure 4 is a horizontal sectional view of the cabinet, showing the wet and dry compartments and also indicating in both full and dotted lines the relationship and arrangement of the cooling coils with respect to the wet compartment or immersion tank.

Figure 5 is a phantom view, showing a preferred arrangement of the cooling coils about the immersion tank and also illustrating the various control elements.

Figure 6 is a side view illustrating a modified form of fin coil construction for the dry storage compartment.

Figure 7 is a phantom view somewhat similar to Figure 5 but illustrating a modified coil construction and refrigerating control elements.

Figure 8 shows a further modification along the same lines.

As shown in the drawings:

Figure 9:
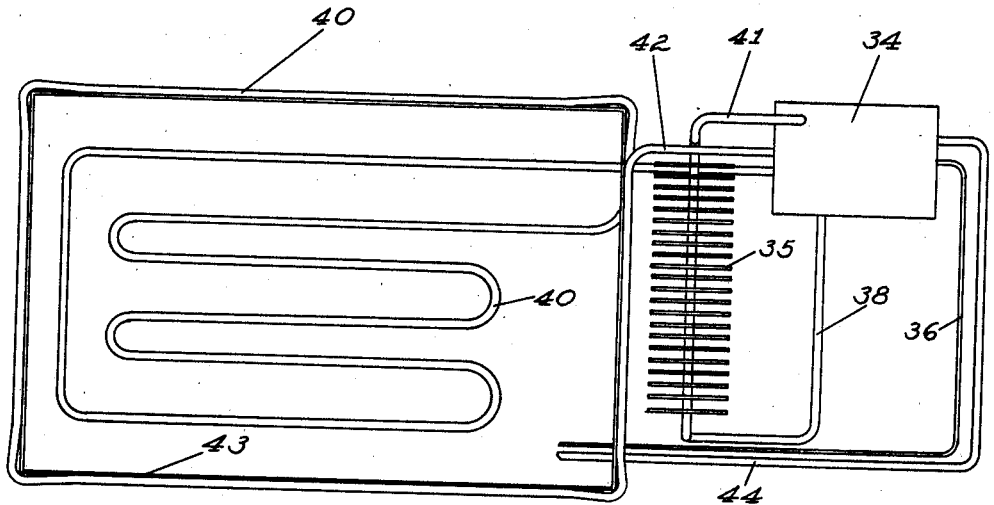
Figure 9 is a top plan view of a further modification of the refrigerating system.

The reference numeral 1 indicates generally the cabinet in which the improved bottle cooler of this invention is housed, the same having a closure or door 2 for the dry storage or precooling compartment and a pair of removable or hinged lid elements 3 for the wet storage compartment or immersion tank. A removable closure 4 is provided for access to the compressor and associated machine elements, access of air to the compressor being provided by means of a grilled opening, as shown at 5.

A bottle cap remover is provided at 6, and a receptacle for the caps is shown at 7.

As above shown in Figure 2 the entire cabinet is thoroughly insulated by provision of the usual insulating material 8 in the walls and cover; and in Figure 3 is best illustrated the immersion tank or wet storage compartment 9. The tank 9 has a grilled cover element 10 slidably mounted on its upper edge, this grilled element being substantially of the extent of one of the lid members 3 whereby it can be maintained in position under either one of such lids. This is for the purpose of preventing access to one side or end of the tank 9 when relatively warm bottles of beverage have been placed therein, and the element 10 may have a sign or other notation thereon advising the customer to take the bottles from the other end of the tank, thereby assuring of the delivery of a perfectly cooled beverage.

The refrigerating system includes the usual compressor 11 and may also include a metered coin-controlled element 12.

The condensed refrigerant is delivered from the compressor to expansion coils, or pipe lines, 13, which first pass through a series of radiating fins 14 and thence extend around the sides of the immersion tank 9 in any one of a series of different windings such as indicated in Figures 5, 7 or 8. The coils 13 also extend under the bottom of the immersion tank 9 and are preferably soldered thereto at regular intervals so as to provide a good contact, and also are completely embedded in and surrounded by an additional layer of insulating material 15, as best shown in Figure 3.

A removable tray element 16 is provided in the dry storage compartment, as best shown in Figure 3, and a drip pan 17 is provided under the fin coils 14. A guard 18 is mounted in the dry storage compartment so as to prevent any possible damage to the fin coils.

From an inspection of Figures 3 and 5 it will be noted that the pipe or coil 13 extends through the fins 14 from one end to the other, starting at the top, from the liquid refrigerant line 19, through a thermostatically controlled valve 20, and thence downwardly and back and forth upwardly until the pipe comprising the coil leaves the fins at the top and then is passed around the three other sides of the immersion tank 9, and finally goes under the bottom of the tank in a further coiled relationship and finally back to the compressor. The control 21 for the thermostatic valve 20 is mounted on the suction line just after it has left the bottom of the immersion tank and just before it leads into the compressor, and a control switch 22 is provided for the motor of the compressor, this control switch being mounted on the suction line at a point just after the same has completed its circuit of the sides of the immersion tank and just before it goes under the bottom of the said tank. In this manner a very effective control of temperature in both the immersion tank and the dry compartment is accomplished.

In Figure 6 is shown a further modification of the invention, wherein the fins 24 are made in two sections, with an air space therebetween, and the coils 23 are pipes known as half-round, or at least flat on one face, and instead of being in the middle of the fins, as shown in Figures 2, 3 and 4, are on the opposed outer faces of the fins, thereby providing one set of coils for the dry storage compartment and another set of coils which actually contact the immersion tank 9.

A further modified form of the coil windings and control for same as shown in Figure 7 wherein the thermostatic valve 30 has its control 31 mounted on the return suction line at a point approximately the same as the point for this control shown in Figure 5, but the control element 32 for the motor switch is mounted on this same suction line at a point just beyond the positioning of the valve controlled element 31 and ahead of it on the line so as to be controlled by the temperature of the refrigerant in the coil 13 just after the coil has completed its circuit of the bottom of the immersion tank 9 and is emerging therefrom.

In Figure 8 is shown a still further modification of the invention, wherein the thermostatic valve 30 and its control element 31 are in the same relative positions as shown in Figure 7 but wherein the motor is controlled by an extension 33 of the return suction line, thereby making the operation of the motor directly subject to the pressure in the system.

Figure 10:
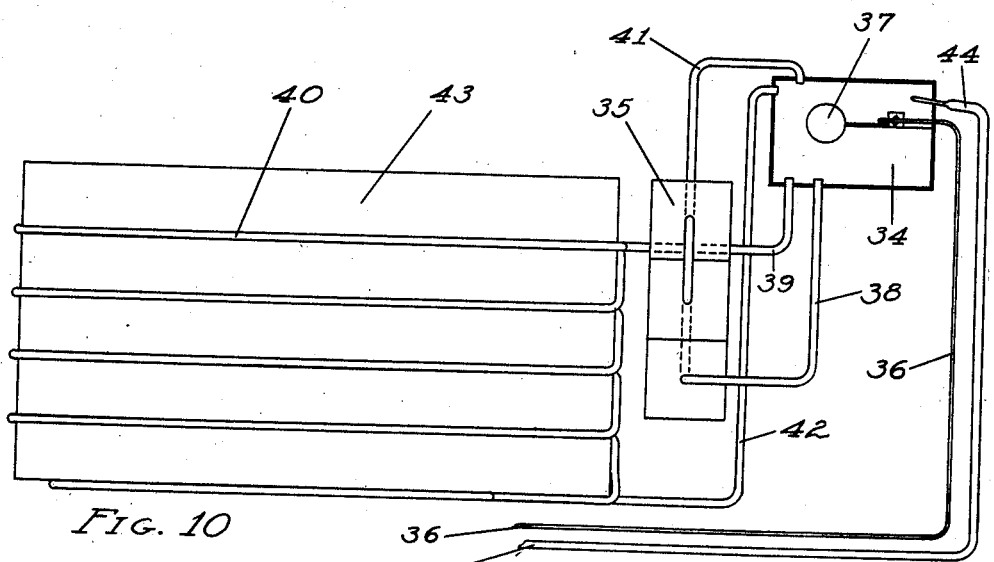
Figure 10 is a side elevation, partly in section, of the apparatus shown in Figure 9.

In Figures 9 and 10 is shown a further modification of the invention, wherein the height of the liquid refrigerant in the entire system is controlled by means of a tank 34 mounted in the cabinet and in juxtaposition to the fin coils 35, there being an inlet pipe 36 provided for delivery of liquid refrigerant to the control tank 34, the level of the liquid in the tank 34 being controlled by means of a float 37. Outlet pipes for liquid refrigerant are provided at 38 and 39 leading from the tank 34 to the fin coils 35 and to the immersion tank coils 40, respectively. A return line 41 is provided from the fin coils allowing gasified refrigerant to enter the top of the tank 34, and a similar return line 42 is provided for the return of gasified refrigerant from the coils 40 which surround and under-lie the immersion tank of the wet storage compartment 43. A return suction line 44 is provided leading from the top of the tank 34, back to the compressor. It will be evident that in this modification a separate system is provided for the immersion tank and for the fin coils for the dry storage compartment, whereby independent operation of these two elements will result.

Figure 11:
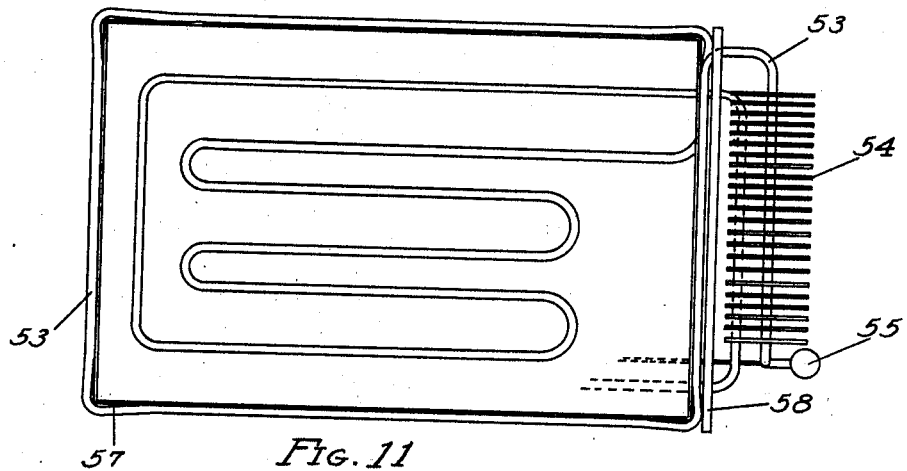
Figure 11 is a top plan view somewhat similar to Figure 9, showing a further modification of the invention.
Figure 12:
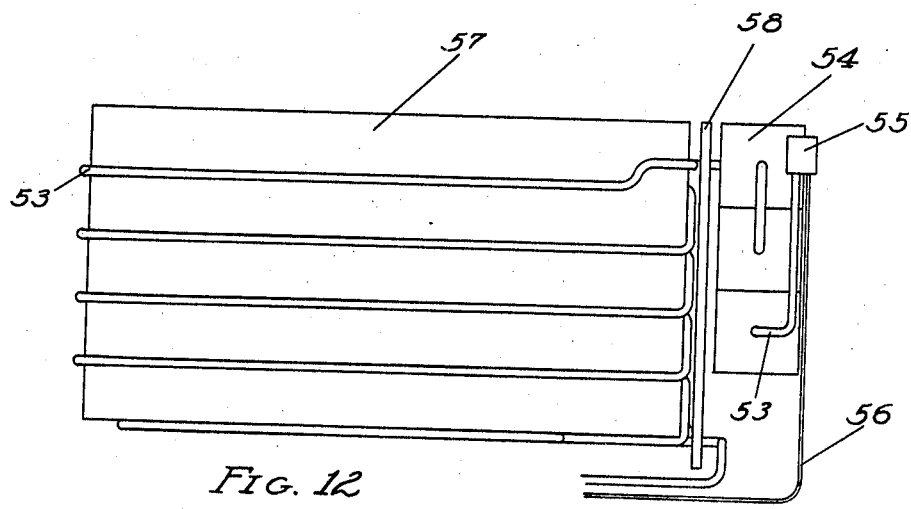
Figure 12 is a side elevation of the device shown in Figure 11.

In Figures 11 and 12 there is illustrated a further modification of the invention which is particularly directed to the relationship of the coils 53 passing through the fins 54, the same being controlled by the usual thermostatic valve 55, which takes liquid refrigerant directly from the compressor to a high side line 56 and delivers it immediately to the low side line or expansion coils 53, which, after passing through the fins 54, surround the immersion tank 57. There are no further controls in this system, except that a plate of insulating material 58 is positioned between the fin coils 54 and the immersion tank 57.

It will be obvious that herein is provided a bottle cooling device which includes a pre-cooling compartment which is normally dry, and a wet cooling compartment which finally delivers the bottled beverages at the desired temperature to the consumer. It is also obvious that the cooling coils may, in addition to refrigerating the immersion tank and the dry refrigerating compartment, also be utilized for other refrigerating apparatus, such as, for example, water coolers, or ice cream compartments, or any other type of device which may possibly be associated with this apparatus.

Furthermore the temperature of approximately 43 degrees in the dry cooling compartment is ideal for the delivery of certain beverages, such as, for example, bottled beers which are preferably delivered at such a temperature as compared with a lower temperature of consumption for carbonated drinks. The dry compartment can also be very satisfactorily used for other refrigerating purposes, as for example the storage and preservation of milk, and other foods. The objectionable drying effect which is common with many refrigerators is not present in this type on account of the relatively large volume of the cooling coils and because of the presence of the water bath in the tank 9. This is also true because the cooling coils which surround the immersion tank are themselves embedded in a solid layer of insulating material, as best shown at 15 in Figure 3.

The freezing effect which is produced by the relationship of the cooling coils to the immersion tank and which presents alternate freezing and thawing cycles, produces a considerable amount of floating ice in the wet compartment or immersion tank, which in addition to constituting valuable sales appeal to prospective customers also provides a considerable amount of actual ice which in the event of the interruption of the power supply will act to keep the entire cabinet at a desirable temperature for a considerable period of time.

It is possible to localize the freezing of the ice on the inner walls of the immersion tank by various arrangements and spacing of the coils; as, for example, the coils may be spaced closer together near the top of the tank and further apart adjacent the bottom, particularly on the sides thereof, as it is at the top where most of the refrigerating effect is ordinarily desired. Furthermore, the action of the coils in the fins, in addition to helping to maintain the temperature in the immersion tank, also operates directly on the dry storage compartment so as to produce the desired controlled temperature in said compartment, and the positioning and relationship of the various control elements can be varied to meet different requirements and also to produce different results.

The operation of the controls is to primarily admit the liquid refrigerant from the compressor to the coils, wherein it expands, producing a cooling effect and an immediate refrigeration of the liquid in the wet storage compartment. This continues until ice is formed on the inside walls of the tank, the ice formations being thicker along the lines where the coils contact the walls of the tank. This effect will continue until the freezing temperature will act upon the control bulb 21 or 31 which respectively control the thermostatic valves 20 and 30 shown in Figures 5, 7 and 8, which will close the expansion valve and the supply of liquid refrigerant through the coils will thereupon cease. In time the temperature of the liquid in the immersion tank will gradually rise, particularly if a new supply of bottled beverage is placed therein, acting to produce a thawing of the ice formations, which will on account of the relatively great conductivity of the metal walls of the tank 9 accordingly break away from the sides of the tank and float on the top of the water bath. Eventually this warming up will influence the bulbs 21 and 31 and open the valves 20 and 30, whereupon the entire cycle is repeated.

Other controls, of course, are provided acting directly upon the motor, as shown in Figures 5, 7 and 8, and these controls may be spaced at various positions along the cooling lines, and may also be operated by some expansible liquids or by the pressure in the system itself.

I am aware that many changes may be made and numerous details of construction varied throughout a wide range without departing from the principles of this invention, and I therefore do not purpose limiting the patent granted thereon otherwise than as necessitated by the prior art.

I claim as my invention:

1. A refrigerating structure including a cabinet, a dry pre-cooling compartment and a wet refrigerating compartment, closures for each of the compartments, and an expansion coil surrounding the wet refrigerating compartment and in contact with the side walls thereof and serving to form both ice and frost upon the inner faces of the side walls of said compartment, together with extensions of the coil underlying the bottom of said wet compartment, and a layer of insulating material surrounding and underlying the wet compartment, the said coils being embedded in said insulating material.

2. A refrigerator comprising a case, a tank in the case adapted to contain a liquid, a closure in the top of the case giving access to the tank, a dry cooling compartment also in the case beyond and below the tank, a closure in the side of the case giving access to the dry compartment, refrigerating expansion coils surrounding the tank and extending into the dry cooling compartment and a layer of insulating material surrounding the walls and under the bottom of the tank, that portion of the coils around and contacting the tank being embedded in the insulating material.

3. A cooler having in combination a case provided with upper closures, an open-top metal tank disposed within the case towards the upper end thereof, a refrigerating unit expansion coil surrounding the tank and embracing its walls to effect efficient thermal contact between the expansion coil and said tank walls and a layer of thermoplastic insulating material around at least three sides and under the tank, said coils embedded in the insulating material wherever possible.

4. A cooler having in combination a case provided with upper closures, an open-top metal tank disposed within the case towards the upper end thereof, a refrigerating unit expansion coil surrounding the tank and embracing its walls to effect efficient thermal contact between the coil and said tank walls, an insulating material surrounding the coils and contacting the tank walls over areas in addition to those contacted by the expansion coil, and a dry storage compartment also within the case, said dry storage compartment having a portion of the expansion coil extending thereinto.

5. A cooler having in combination a case provided with upper closures, an open-top metal tank disposed within the case towards the upper end thereof, a refrigerating unit expansion coil surrounding the tank and embracing its walls to effect efficient thermal contact between the coil and said tank walls, an insulating material surrounding the coils and contacting the tank walls over areas in addition to those contacted by the expansion coil, a dry storage compartment also within the case, said dry storage compartment having a portion of the expansion coil extending thereinto, and control means for the expansion coil in the dry storage compartment.

6. A cooler having in combination a case provided with upper closures, an open-top metal tank disposed within the case towards the upper end thereof, a refrigerating unit expansion coil surrounding the tank and embracing its walls to effect efficient thermal contact between the coil and said tank walls, an insulating material surrounding the coils and contacting the tank walls over areas in addition to those contacted by the expansion coil, a dry storage compartment also within the case, said dry storage compartment having a portion of the expansion coil extending thereinto, control means for the expansion coil in the dry storage compartment, together with a compressor and motor in the case adapted to deliver refrigerant to the expansion coil, and control means for the motor on that portion of the expansion coil within the dry storage compartment.

7. A bottle cooler comprising a cabinet, a dry cooling compartment and a wet refrigerating compartment in the cabinet, a closure for each of the compartments, a refrigerating coil surrounding the sides and contacting the bottom of the wet compartment and communicating with the dry cooling compartment, for freezing action on the sides but not the bottom of the wet compartment, and metal fins on that portion of the refrigerating coil in the dry cooling compartment, the refrigerating coil positioned in the side faces of said fins and being flattened adjacent said side faces.

8. A refrigerant comprising a case, a tank in the case adapted to contain a liquid, a closure in the top of the case giving access to the tank, a dry cooling compartment also in the case, a closure in the side of the case giving access to the dry compartment, a refrigerating expansion coil embracing the side walls of the tank in contact therewith and including a portion underlying the bottom of the tank, and a portion disposed in the dry cooling compartment, a layer of insulating material cooperating with the side walls and bottom of the tank to enclose the corresponding portions of said refrigerating coil, and a compressor connected to deliver refrigerant first to the portion of the coil in the dry compartment, thence to the portion of the coil embracing the side walls of the tank, and finally to the portion extending under the bottom of the tank.

ROBERT H. GUYTON.